United States Patent [19]

Lehmann

[11] 4,363,035
[45] Dec. 7, 1982

[54] METHOD AND APPARATUS FOR SIGNAL PICK-UP FROM SEMICONDUCTOR IMAGE OR LINE SENSORS

[75] Inventor: Klaus Lehmann, Mühltal, Fed. Rep. of Germany

[73] Assignee: Robert Bosch GmbH, Stuttgart, Fed. Rep. of Germany

[21] Appl. No.: 254,448

[22] Filed: Apr. 15, 1981

[30] Foreign Application Priority Data

Apr. 24, 1980 [DE] Fed. Rep. of Germany ....... 3015806

[51] Int. Cl.³ .................... H04N 3/14; H04N 5/14; H04N 5/34
[52] U.S. Cl. .................... 358/213; 358/167; 358/217; 358/184
[58] Field of Search ............ 358/209, 213, 166, 167, 358/217, 184, 284, 293, 294

[56] References Cited

U.S. PATENT DOCUMENTS 3,136,848  6/1964  Woodworth .................. 358/184
3,238,295  3/1966  Meinl et al. .................. 358/217
4,101,932  7/1978  Wiggin ........................ 358/223
4,274,113  6/1981  Ohba et al. .................. 358/212

OTHER PUBLICATIONS

IEEE Transactions on Electron Devices, vol. ED-25, No. 2, pp. 85-89, Feb. 1978.

Primary Examiner—Robert L. Richardson
Attorney, Agent, or Firm—Frishauf, Holtz, Goodman & Woodward

[57] ABSTRACT

Signals are picked off from semiconductor image or line sensors in clock pulse intervals corresponding to successive picture elements (in order to improve the signal-to-noise ratio, an amplifier with a high input resistance is used, the charge of the output capacitance of the sensor produced at the instant of the last clock pulse is substantially maintained during a first part of the clock interval, so that the full amplitude can be picked off after transients have died down and thereafter, in a second part of the clock pulse interval, the charge is drained away.

7 Claims, 8 Drawing Figures

METHOD AND APPARATUS FOR SIGNAL PICK-UP FROM SEMICONDUCTOR IMAGE OR LINE SENSORS

This invention concerns the obtaining of signals from semiconductor image or line sensors in television equipment in which in synchronism with control pulses a capacitance representing the output of the sensor is provided with charges representing the current magnitude of the signal.

A method is known for pick-up of signals from television camera tubes in which the signals are supplied to a preamplifier of relatively low input resistance. This has the result that the output capacitance of the television camera tube does not begin to make itself noticeable as a source of distortion at very low frequencies. Very good signal-to-noise ratios are thus obtained with television camera tubes. In the case of semiconductor image or line sensors this known method produced no satisfactory results, however.

THE INVENTION

It is an object of the invention to provide a method for picking up signals from semiconductor image or line sensors by which the largest possible signal-to-noise ratio can be obtained.

Briefly, within each period of clock signals the signals are taken off at the output of the sensor at a moment when, on the one hand, they have an amplitude as great as possible and, on the other hand, are free from interference. It is particularly advantageous, after a first part of the clock period has elapsed, to cause the output of the sensor to be discharged during a second part of the period with a current, the magnitude of which is substantially proportional to the magnitude of the signal.

DRAWINGS

The invention is further described by way of example with reference to the annexed drawings, in which.

DESCRIPTION OF THE ILLUSTRATED EMBODIMENTS

Figure 1:
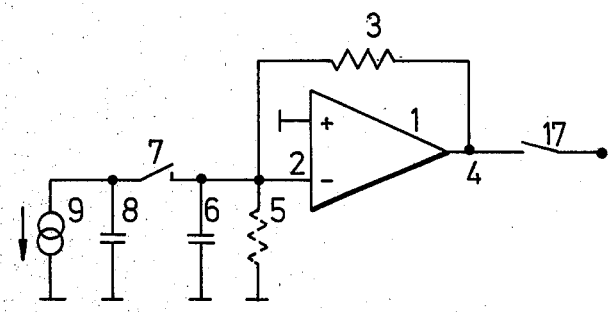
FIG. 1 is a diagram of a circuit essentially as it is used for television camera tubes.

The circuit of FIG. 1 consists essentially of an inverting amplifier 1 at the input 2 of which can be connected the output electrode of a television camera tube or to a semiconductor image or line sensor. The input 2 is also connected through a resistor 3 to the output 4 of the amplifier 1. By this negative feedback, the result is obtained that even without the use of a noise-producing low-ohm resistance, the amplifier input has a relatively low input resistance of, for example, 1 k ohms. For indicating this on the diagram, this virtual input resistance 5 is shown in broken lines in FIG. 1.

In FIG. 1 there is further shown schematically the output circuit of a semiconductor image or line sensor that is connected to the input 2 of the amplifier 1. The output capacitance of the sensor, together with the remaining circuit capacitances of the lead from the sensor to the amplifier, and the input capacitance of the amplifier as well, are represented by the capacitance 6 in the figure. For successive picture dots or elements, the switch 7 is briefly closed to supply a charge to the capacitor 6 which corresponds to the brightness or light intensity of each picture element. The switch 7 briefly connects the capacitor 8 with the capacitor 6, so that a transfer of charge is possible. The capacitor 8 is charged from a current source 9 by a current representing the momentary brightness of each element of the picture.

Figure 1A:
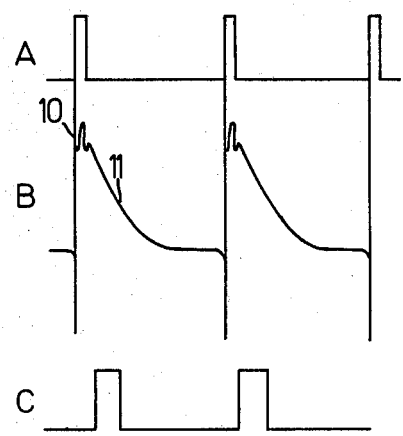
FIG. 1a is a voltage-time graph relating to FIG. 1.

In FIG. 1a is shown in line A thereof the clock pulses for controlling the switch 7. The frequency of these pulses is of the order of a few megahertz. In line B, the course of voltage on the capacitor 6 is shown, with disturbance peaks 10 appearing that are several times the amplitude of the actual signal 11. In order to prevent the propagation of these disturbance peaks, an additional switch 17 can be provided that can, for example, be turned on with the pulses represented in line C. In that case, however, the signal 11 will be picked up when it no longer has its greatest amplitude. Since the signal, in any event, has an amplitude of only a few millivolts, this procedure means a deterioration of the margin of safety against interfering disturbances.

Figure 2:
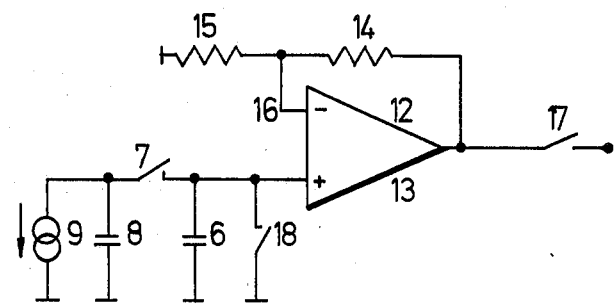
FIG. 2 is a diagram of a circuit of an embodiment of the invention.

In the circuit of FIG. 2, the output circuit of a sensor is again shown, as in FIG. 1 with the same elements designated 6,7,8 and 9. The output of the sensor is in this case not connected, as it was in FIG. 1, with the inverting input of an amplifier, but rather with the non-inverting input of an amplifier 12. The output 13 of the amplifier 12 is connected for negative feedback purposes over a voltage divider 14,15 with the inverting input 16 of the amplifier. Hence, in the case of this amplifier, the input resistance is not reduced by means of the negative feedback, as in the case of the amplifier 1 of FIG. 1, but the amplifier instead maintains a relatively high input resistance. At the output 13 of the amplifier 12, there is also a switch 17 connected that prevents the further propagation of the disturbance peaks arising at the time of the transfer of the charge of the capacitor 8 to the capacitor 6. After the pick-off of the signal by means of the switch 17, the charge of the capacitor 6 is extinguished by means of the switch 18, so that the charge supplied to the capacitor 6 in the following clock period corresponds merely to the charge of the next picture dot or element. A voltage-time diagram of the voltage on the capacitor 6 is illustrated in line A of FIG. 2a. The lines B and C show pulses that can be used for control of the switches 17 and 18 respectively. It is evident from line A of FIG. 2a that in the circuit of FIG. 2 the output signal of the sensor is picked up while it still has its full amplitude. The switching of such small voltages with presently known electronic components, for example with field-effect transistors, is critical, however, because the flanks of the switching pulse are transferred directly to the voltages to be switched as the result of the internal capacitance of the component. In this manner, there arise again disturbing pulses, the magnitude of which exceeds the useful signal many times over.

Figure 2A:
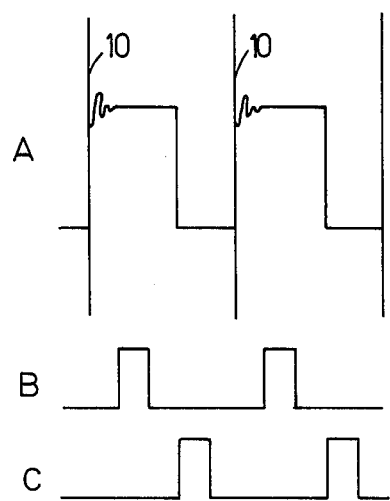
FIG. 2a is a voltage-time graph relating to FIG. 2.
Figure 3:
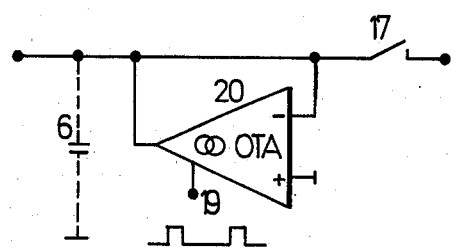
FIG. 3 is a diagram of a further illustrative embodiment of the invention.

An improvement in this regard is obtained by the embodiment shown in FIG. 3 where in an arrangement like FIG. 1 instead of the switch 18, there is provided the use of a so-called operational transductance amplifier. This amplifier has a current output of which the output current is proportional to the difference between the voltages at the two inputs and, furthermore, flows only when a corresponding voltage is applied to the output 19. Hereinafter, the conventional abbreviation OTA is used to designate this amplifier. Both the inverting input and the output of the OTA 20 are connected with the output of the sensor and to the input of the amplifier 12 (FIG. 2). During the appearance of the pulse shown in line C of FIG. 2a, at the control input 19 of the OTA 20, the capacitor 7 is discharged. This discharge continues so long as the input voltage of the OTA is different from zero. No additional disturbance peaks appear in this process.

Figure 4:
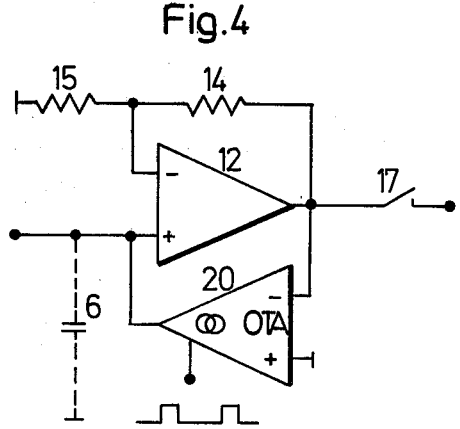
FIG. 4 is a diagram of a third embodiment of the invention.

A further improvement of the circuit of FIG. 3 is illustrated in FIG. 4. In this case, the OTA 20 is connected to the output of the amplifier 12. The result is thereby obtained that the amplifier 12 is brought into the control or regulation loop formed by the OTA 20, so that any drift of the amplifier 12 that may eventually appear can be regulated out.

Figure 5:
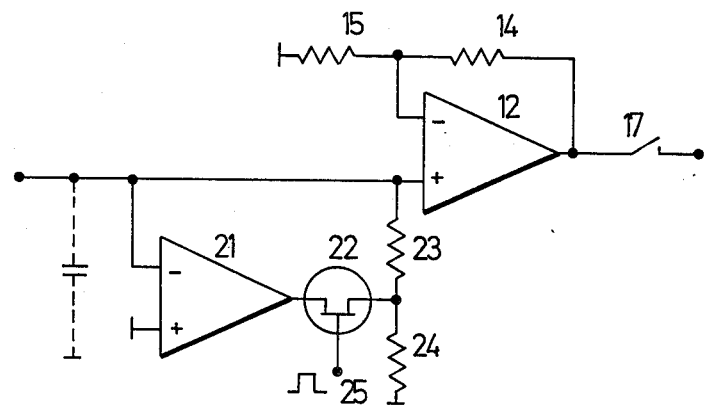
FIG. 5 is a diagram of an embodiment of the invention having two amplifiers.

The OTA's now available are, however, relatively slow, and can be utilized only to a limited extent for video applications A circuit that operates substantially quicker is illustrated in FIG. 5. Compared to the circuit of FIG. 3, an additional amplifier 21 is provided instead of the OTA 20 and the output of the amplifier 21 is connected on one hand through a resistance 23 with the input of the amplifier 12 and on the other hand to a fixed potential through a further resistance 24.

The pulses shown in line C of FIG. 2a are supplied to the control input 25 of the switch 22. The manner of operation is similar to that of the circuit according to FIG. 3. The resistance 23 is substantially greater than the resistance 24. In a practical embodiment of this circuit, the resistance 23 had a value of 100 k ohms and the resistance 24 a value of 100 ohms. In this manner, the result is obtained that a disturbance peak transmitted by the internal capacitance of the switch 22 from its control electrode 25 is strongly damped.

Figure 6:
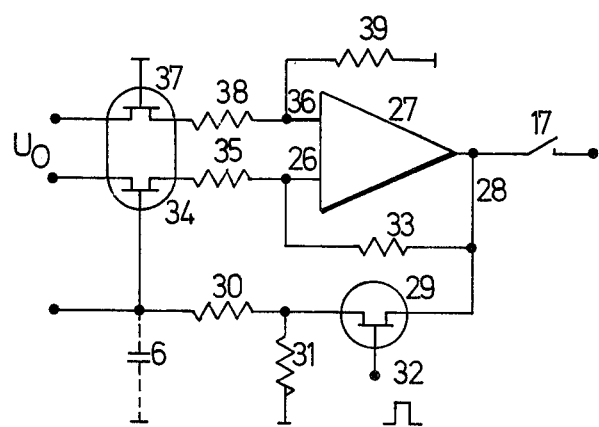
FIG. 6 shows a more elaborate embodiment having an amplifier.

A circuit in which only one amplifier is used is shown in FIG. 6. Only the capacitance 6 of the sensor is shown in this figure. The output of the sensor is in this case connected with the inverting input 26 of an amplifier 27. In order to produce the discharge of the capacitor 6 as explained in connection with FIG. 5, the output 28 of the amplifier 27 is connected through a field-effect transistor 29 and a resistor 30 with the capacitance 6. At the same time, the electrode of the field-effect transistor 29 that is on the side of that device which is furthest away from the output 28 of the amplifier 27, is connected with fixed potential (e.g. ground) by asecond resistor 31. The control electrode 32 of the field-effect transistor 29 is supplied with the pulses illustrated in line C of FIG. 2a. A resistor 33, which is disposed between the output 28 and the inverting input 26 of the amplifier 27, functions as a negative feedback connection and provides the amplifier 27 with a sufficiently stable degree of amplification. Since the inverting amplifier input is thereby given a low-ohm internal resistance, however, whereas in connection with the present invention a high-ohm amplifier input is required in order to prevent a premature discharge of the capacitor 6, an impedance converter, consisting of a field-effect transistor 34 and the resistor 35 is connected ahead of the inverting input 26 of the amplifier. The field-effect transistor 34 is of course connected to a corresponding operating voltage $+U_0$. For prevention of drifts, the non-inverting input 36 of the amplifier 27 is connected with the same elements as the input 26, these being the field-effect transistor 37, which is housed in a single casing with the field-effect transistor 34 and the resistors 38 and 39.

Although the invention has been described with reference to particular illustrative examples, it is to be understood that further variations and modifications are possible within the inventive concept. Image and line sensors are well known in the art. An example has been described in IEEE Transactions on Electron Devices Feb. 1978, vol. ED-25, No. 2 pp. 85 to 89, Anagnostopoulos: Signal Readout in CiD Image Sensors.

I claim:

1. Method of picking up signals from a semiconductor image or line sensor at intervals defined by the frequency of a first set of periodic pulses, comprising the steps of:
    charging a capacitance (6) associated with said sensor at the output thereof upon occurence of each of a first set of periodic pulses in accordance with the state of said sensor;
    maintaining the charge of said capacitance for a first part of the interval between pulses of said first set;
    deriving a signal from said charge of said capacitance during a portion of said first part of said interval offset in time from said first set of pulses sufficiently for the dying away of transient disturbances related to said first set of pulses, and
    discharging said capacitance during a second part of said interval following said first part thereof.

2. Method as defined in claim 1, in which said step of discharging said capacitance is carried out by supplying to the output of said sensor a current of which the magnitude is substantially proportional to the magnitude of the signal and the direction of which is such as to remove the charge previously maintained in said capacitance.

3. Apparatus for picking up signals from semiconductor image or line sensors at intervals defined by the frequency of a first set of periodic pulses serving to transfer a sensor signal to an output of said sensor having an output capacitance, comprising:
    an amplifier circuit having a high input resistance connected to the output of said sensor;
    a controllable current source connected to said output of said sensor having an inverting control input connected to the output of said amplifier and having means for switching said current source on and off, and
    means for operating said switching means to switch on said current source after the lapse of a first part of the interval between pulses of said first set of pulses so a to activate said current source for at least a portion of the remaining part of said interval between the pulses of said first set.

4. Apparatus as defined in claim 3, in which said amplifier circuit includes an operational amplifier with its non-inverting input connected to the output of said sensor, and in which said controllable current source is constituted as an operational transductance amplifier having its inverting input connected to the output of said first-mentioned amplifier and having its output connected to said sensor (FIG. 4).

5. Apparatus for picking up signals from semiconductor picture or line sensors at intervals defined by the frequency of a first set of periodic pulses, comprising:

an operational transductance amplifier (OTA) having both its output and its inverting input connected to the output of said sensor, means for applying pulses for intermittently enabling said operational transductance amplifier after the lapse of a first part of the interval between said pulses of said first set and during a second part of said interval, for discharge of the capacitance of the output of said sensor, and an amplifier of high input resistance having its input connected to the output of said sensor.

6. Apparatus as defined in claim 3, in which said controllable current source is constituted as a second amplifier having an inverting input connected to the output of said sensor and having its output connected through said current source switching means to a junction of first and second resistances, said first resistance leading to a connection with said output of said sensor and having a higher value of resistance than said second resistance, said second resistance leading to a connection with a fixed potential.

7. Apparatus as defined in claim 3, 5 or 6, in which the second switching means (17) are included for providing an output of said high input resistance amplifier (12) to an external circuit only during a portion of said first part of said interval which part is offset in time from said pulses of said first set for determining the moment of signal pick-up.

* * * * *